United States Patent
Hsieh

(10) Patent No.: US 8,145,130 B2
(45) Date of Patent: Mar. 27, 2012

(54) PORTABLE ELECTRONIC DEVICE

(75) Inventor: Hsing-Yuan Hsieh, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 302 days.

(21) Appl. No.: 12/567,912

(22) Filed: Sep. 28, 2009

(65) Prior Publication Data
US 2010/0144277 A1     Jun. 10, 2010

(30) Foreign Application Priority Data
Dec. 8, 2008  (CN) .......................... 2008 1 0306046

(51) Int. Cl.
*H04B 7/00* (2006.01)
(52) U.S. Cl. .................... 455/41.2; 455/410; 455/414.1; 455/567; 455/573; 455/574; 455/556.1; 340/5.64; 340/539.1; 340/572.4; 725/24; 725/74
(58) Field of Classification Search ................. 455/41.2, 455/567, 573–574, 414.1, 410, 556.1; 340/323 R, 340/7–54, 5.64, 539.1; 725/24, 74; 369/5; 353/122
See application file for complete search history.

(56) References Cited

U.S. PATENT DOCUMENTS

| | | | | |
|---|---|---|---|---|
| 5,559,501 A * | 9/1996 | Barzegar et al. | ............... | 361/728 |
| 5,684,828 A * | 11/1997 | Bolan et al. | ................... | 340/10.2 |
| 6,191,743 B1 * | 2/2001 | Jones et al. | ................... | 343/702 |
| 2008/0106399 A1* | 5/2008 | Yaqub et al. | ............. | 340/539.11 |
| 2009/0207014 A1* | 8/2009 | Ayed | ........................ | 340/539.13 |
| 2010/0069007 A1* | 3/2010 | Nagasawa | .................... | 455/41.3 |
| 2011/0032098 A1* | 2/2011 | Yang | ............................. | 340/540 |

* cited by examiner

*Primary Examiner* — Marceau Milord
(74) *Attorney, Agent, or Firm* — Altis Law Group, Inc.

(57) ABSTRACT

A portable electronic device includes a short distance wireless communicating module and a warning unit. The short distance wireless communicating module is used to establish short distance wireless communicating network with another portable eletronic device and monitor whether the other portable electronic divice is out of wireless network range. The warning unit electrically connects with a short distance wireless communicating module to send out an alarm if the portable electronic device is out of wireless network range.

18 Claims, 2 Drawing Sheets

PORTABLE ELECTRONIC DEVICE

BACKGROUND

1. Technical Field

The exemplary disclosure generally relates to portable electronic devices, and particularly, to a portable electronic device with a short distance wireless communicating function.

2. Description of Related Art

With the development of wireless communication and information processing technologies, portable electronic devices such as mobile phones and personal digital assistants (PDAs) are now in widespread use, and consumers may now enjoy the full convenience of high technology products almost anytime and anywhere.

More and more families like to take their children out for travelling, shopping, walking, etc. during their spare time. In crowded areas such as shopping centers, amusement parks, etc, the children may easily be lost or strayed in the crowd.

Therefore, there is room for improvement within the art.

BRIEF DESCRIPTION OF THE DRAWINGS

Many aspects of the portable electronic device can be better understood with reference to the following drawings. These drawings are not necessarily drawn to scale, the emphasis instead being placed upon clearly illustrating the principles of the present portable electronic device. Moreover, in the drawings like reference numerals designate corresponding sections throughout the several views.

DETAILED DESCRIPTION

Figure 1:
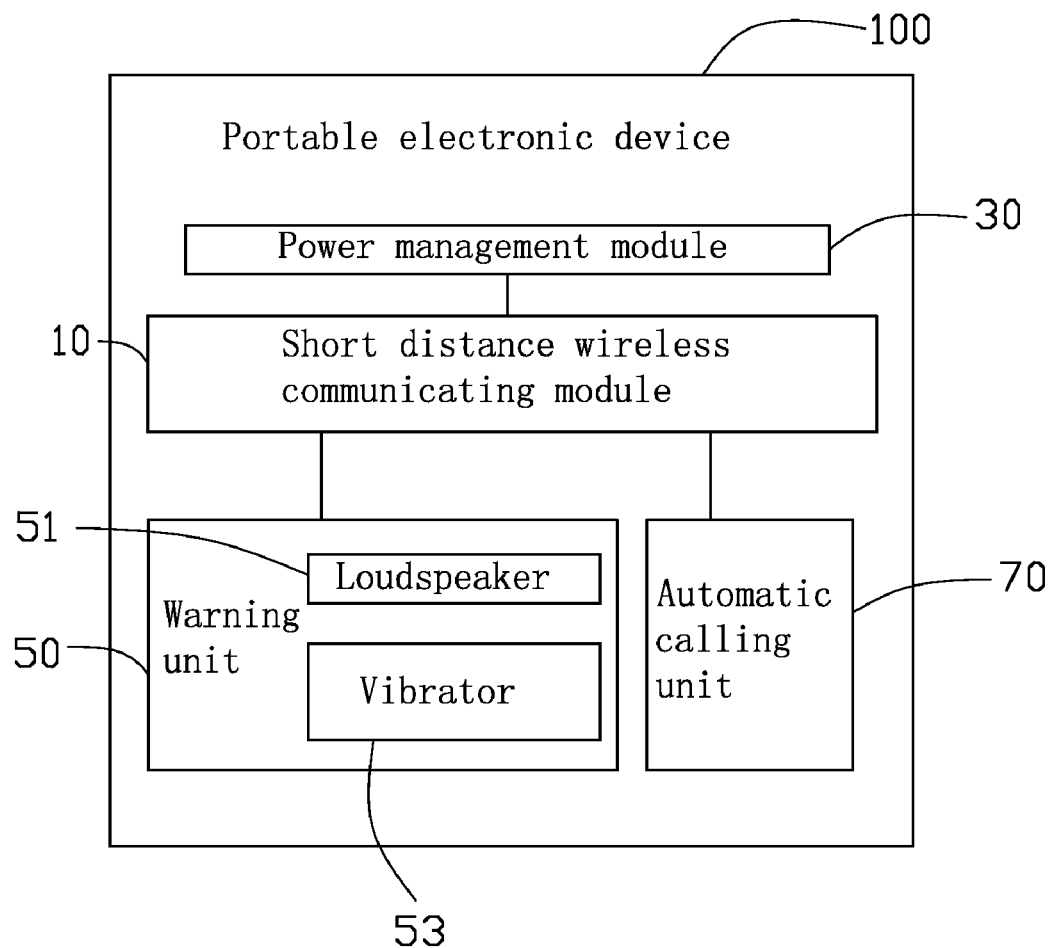
FIG. 1 shows a block diagram of a portable electronic device, according to an exemplary embodiment.

FIG. 1 shows a block diagram of a portable electronic device 100, according to an exemplary embodiment, the exemplary portable electronic device 100 may be an electronic device with a short distance communicating function, such as a mobile phone, a personal digital assistant (PDA), etc. The portable electronic device 100 can establish a short distance wireless communication network with another portable electronic device 100 to achieve short distance supervisory control over other portable electronic devices 100, carried separately by others. The portable electronic device 100 includes a short distance wireless communicating module 10, a power management module 30, a warning unit 50 and an automatic calling unit 70.

The short distance wireless communicating module 10 is assembled within the portable electronic device 100. The short distance wireless communicating module 10 may be a bluetooth module or a near field communication (NFC) module for establishing a short distance wireless communicating network with another portable electronic device 100 and executing instructions such as activating the short distance communicating function, receiving and sending out control signals, searching and matching with another portable electronic device 100, setting warning mode, setting effective control distance, etc.

The power management module 30 electrically connects with the short distance wireless communicating module 10 to distribute power of a battery of the portable electronic device 100 to the short distance wireless communicating module 10, and monitor whether the power of the battery can support operation of the short distance wireless communicating module 10. When the power is low, the power management module 30 will trigger the short distance wireless communicating module 10 to send out a low voltage signal to other portable electronic devices 100 on the network to remind the users of the other portable electronic devices 100 that this portable electronic device 100 is low in power.

The warning unit 50 electrically connects with the short distance wireless communicating module 10, and includes a loudspeaker 51 and a vibrator 53. When the short distance wireless communicating module 10 detects that the portable electronic device 100 is beyond or far away from the preset warning distance or the cover area of the short distance wireless communicating network, the short distance wireless communicating module 10 will trigger the warning unit 50 to send out an alarm.

The automatic calling unit 70 electrically connects with the short distance wireless communicating module 10 and is controlled or triggered by the short distance wireless communicating module 10 to call or dial a pre-called number set by the user automatically.

Figure 2:
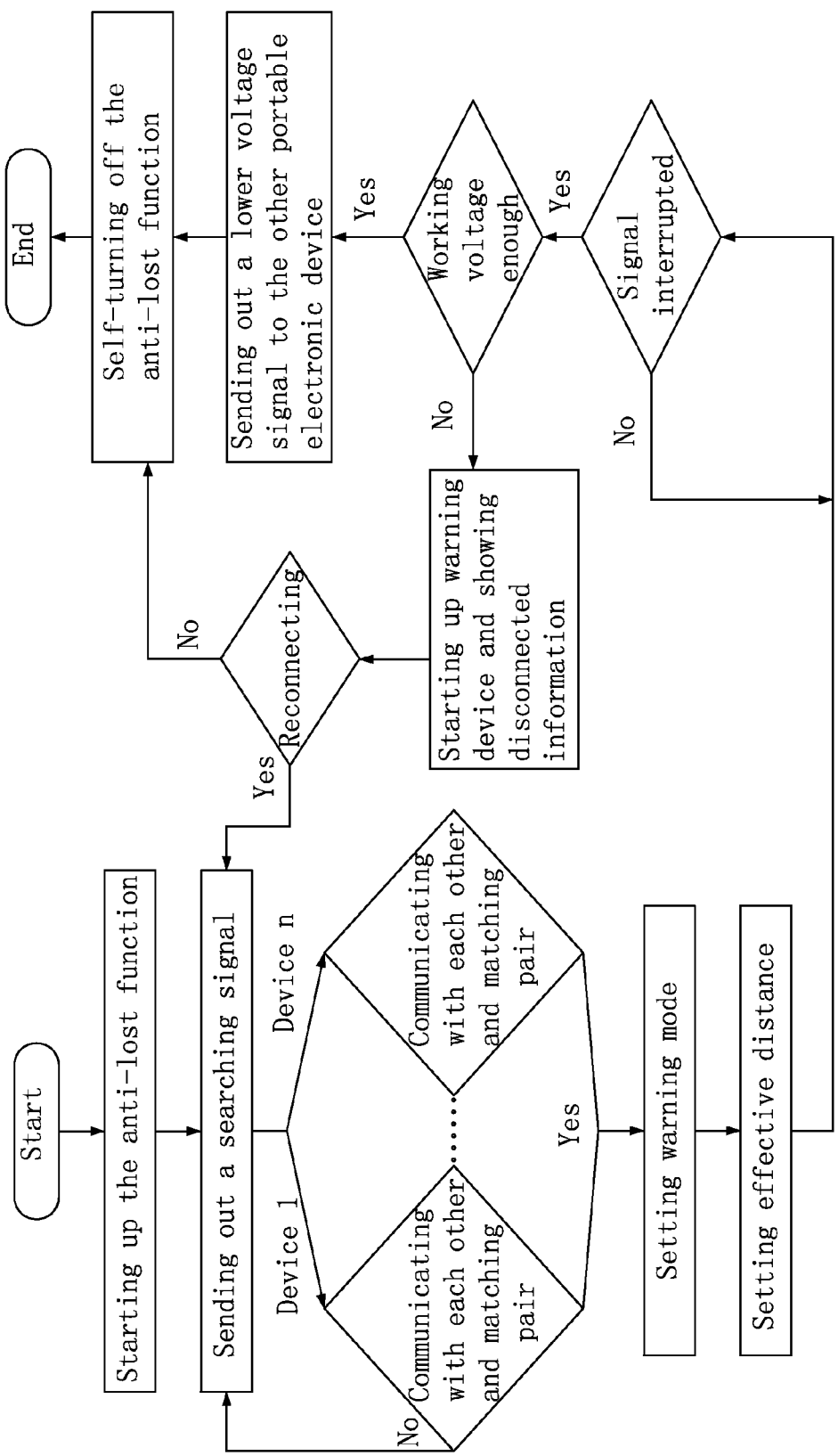
FIG. 2 shows a flow chart of the portable electronic device shown in FIG. 1 for establishing a short distance wireless communication network with another portable electronic device, in accordance with an exemplary embodiment.

FIG. 2 shows a flow chart of the portable electronic device 100 shown in FIG. 1 for establishing a short distance wireless communicating network with another portable electronic device 100, in accordance with an exemplary embodiment. When using the portable electronic device 100, each user carries a portable electronic device 100 with a short distance wireless communicating function. Firstly, the short distance wireless communicating module 10 of the portable electronic device 100 is activated to start up the location function of the portable electronic device 100. Secondly, the short distance wireless communicating module 10 of one of the portable electronic devices 100 sends out a searching signal to communicate and match with the other portable electronic devices 100. Thus, the portable electronic devices 100 establish a short distance wireless communicating network together. Finally, setting the warning mode (by the user) and effective distance to make the short distance wireless communicating module 10 trigger the warning unit 50 to send out an alarm or trigger the automatic calling unit 70 to call or dial a pre-called number set by the user automatically when the portable electronic device 100 is far or out of wireless network range.

During the using process, the short distance wireless communicating module 10 of each portable electronic device 100 will monitor the short distance wireless communicating network in real-time. When the short distance wireless communicating module 10 of one portable electronic device 100 detects that the wireless communications between itself and other portable electronic devices 100 are disconnected, the power management module 30 will detect whether the power of the portable electronic device 100 is low and thus caused the interrupt. If the power of the portable electronic device 100 is too low to operate properly, the power management module 30 will trigger the short distance wireless communicating module 10 to send out a low voltage signal to the user of the other portable electronic device 100. Thus, the portable electronic device 100 will automatically turn off the location function and quit the short distance wireless communicating network. Then, the user may replace or charge the battery of the portable electronic device 100 and make the portable electronic device 100 re-establish the short distance wireless communicating network. If the power of the portable electronic device 100 is high enough to operate properly, the short distance wireless communicating module 10 will trigger the warning unit 50 to warn or/and trigger the automatic calling unit 70 to call or dial the pre-called number set by the user automatically.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A portable electronic device, comprising:
   a short distance wireless communicating module configured to establish a short distance wireless communicating network with another portable electronic device and monitor whether the another portable electronic device is out of wireless network range;
   a warning unit electrically connecting with the short distance wireless communicating module to send out an alarm as soon as the another portable electronic device is out of wireless network range; and
   an automatic calling unit electrically connecting with the short distance wireless communicating module and being controlled or triggered by the short distance wireless communicating module to automatically call or dial a number preset by a user when the another portable electronic device is out of wireless network range.

2. The portable electronic device as claimed in claim 1, wherein the short distance wireless communicating module is a bluetooth module assembled within the portable electronic device for establishing short distance wireless communicating network with another portable electronic device and executing corresponding instructions.

3. The portable electronic device as claimed in claim 2, wherein the instructions include activating the short distance communicating function, receiving and sending out control signals, searching and matching with another portable electronic device, setting warning modes and setting effective control distances.

4. The portable electronic device as claimed in claim 1, wherein the short distance wireless communicating module is a near field communication module assembled within the portable electronic device for establishing short distance wireless communicating network with another portable electronic device.

5. The portable electronic device as claimed in claim 1, wherein the portable electronic device further includes a power management module electrically connecting with the short distance wireless communicating module to distribute battery power to the short distance wireless communicating module, and monitor whether the battery power can support the operation of the short distance wireless communicating module.

6. The portable electronic device as claimed in claim 5, wherein the warning unit includes a loudspeaker electrically connecting with and being controlled by the short distance wireless communicating module to send out the alarm.

7. The portable electronic device as claimed in claim 6, wherein the warning unit further includes a vibrator, when the short distance wireless communicating module detects that the another portable electronic device is out of wireless network range, the short distance wireless communicating module will trigger the vibrator to work.

8. The portable electronic device as claimed in claim 5, wherein the power management module triggers the short distance wireless communicating module to send out a low voltage signal to the another portable electronic device to remind the user(s) of the another portable electronic device that their portable electronic device will run out of power.

9. The portable electronic device as claimed in claim 1, wherein the portable electronic device may be a mobile phone or a personal digital assistant.

10. A portable electronic device, comprising:
    a short distance wireless communicating module configured to establish short distance wireless communicating network with another portable electronic device and monitor whether the another portable electronic device is out of wireless network range; and
    an automatic calling unit electrically connecting with the short distance wireless communicating module and being controlled or triggered by the short distance wireless communicating module to automatically call or dial a number preset by a user when the another portable electronic device is out of wireless network range.

11. The portable electronic device as claimed in claim 10, wherein the portable electronic device further includes a warning unit electrically connecting with the short distance wireless communicating module to send out an alarm as soon as the another portable electronic device is out of wireless network range.

12. The portable electronic device as claimed in claim 11, wherein the short distance wireless communicating module is a bluetooth module assembled within the portable electronic device for establishing short distance wireless communicating network with the another portable electronic device and executing corresponding instructions.

13. A portable electronic device, comprising:
    a short distance wireless communicating module configured to establish a short distance wireless communicating network with another portable electronic device and monitor whether the another portable electronic device moves out of wireless network range;
    a warning unit electrically connecting with the short distance wireless communicating module to send out an alarm as the another portable electronic device moves out of wireless network range;
    an automatic calling unit electrically connecting with the short distance wireless communicating module and being controlled or triggered by the short distance wireless communicating module to automatically call or dial a number preset by a user when the another portable electronic device is out of wireless network range; and
    a power management module electrically connecting with the short distance wireless communicating module to distribute battery power to the short distance wireless communicating module, and monitor whether the battery power can support the operation of the short distance wireless communicating module.

14. The portable electronic device as claimed in claim 13, wherein when the short distance wireless communicating module is disconnected from the another portable electronic device, the power management module detects whether the battery power is too low to make the portable electronic device operate properly.

15. The portable electronic device as claimed in claim 14, wherein if the battery power is too low to operate properly, the power management module triggers the short distance wireless communicating module to send out a low voltage signal to the another portable electronic device, the another portable electronic device automatically quitting the short distance wireless communicating network.

16. The portable electronic device as claimed in claim 15, wherein if the battery power is high enough to continue operating properly, the short distance wireless communicating module triggers the warning unit to send out the alarm and/or triggers the automatic calling unit to call or dial the preset number.

17. The portable electronic device as claimed in claim 16, wherein the warning unit includes a loudspeaker electrically connecting with and being controlled by the short distance wireless communicating module to sound an alarm.

18. The portable electronic device as claimed in claim 17, wherein the warning unit further includes a vibrator, when the short distance wireless communicating module detects that the another portable electronic device has moved out of wireless network range, the short distance wireless communicating module triggers the vibrator to work.

\* \* \* \* \*